US009521691B2

(12) United States Patent
Chen et al.

(10) Patent No.: US 9,521,691 B2
(45) Date of Patent: Dec. 13, 2016

(54) WIRELESS COMMUNICATION DEVICE AND METHOD

(71) Applicant: REALTEK SEMICONDUCTOR CORPORATION, Hsinchu (TW)

(72) Inventors: Yu Chen, Kaohsiung (TW); Tsung-Hsuan Lee, Taipei (TW); Chung-Yao Chang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 67 days.

(21) Appl. No.: 14/656,320

(22) Filed: Mar. 12, 2015

(65) Prior Publication Data

US 2015/0365971 A1 Dec. 17, 2015

(30) Foreign Application Priority Data

Jun. 13, 2014 (TW) .............................. 103120632 A

(51) Int. Cl.
*G01R 31/08* (2006.01)
*H04W 74/08* (2009.01)
(52) U.S. Cl.
CPC ................. *H04W 74/0816* (2013.01)
(58) Field of Classification Search
CPC .................. H04W 74/0816; H04W 24/08
See application file for complete search history.

(56) References Cited

U.S. PATENT DOCUMENTS

2004/0150760 A1* 8/2004 Chung .............. G02F 1/136259
349/43
2007/0060155 A1* 3/2007 Kahana ............... H04W 72/085
455/450

(Continued)

FOREIGN PATENT DOCUMENTS

TW 200718132 5/2007

OTHER PUBLICATIONS

Office Action dated Jun. 25, 2015 of the counterpart Taiwan application No. 103120632.

(Continued)

*Primary Examiner* — Robert Wilson
(74) *Attorney, Agent, or Firm* — WPAT, P.C., Intellectual Property Attorneys; Anthony King

(57) ABSTRACT

The present disclosure discloses a wireless communication device and method capable of adaptively permitting packet transmission or adjusting a threshold for packet transmission. An embodiment of said wireless communication device includes a reception circuit, a control circuit and a transmission circuit. The reception circuit measures signal energy, generates multiple energy measurement values, and generates multiple comparison results according to the energy measurement values and at least a threshold. The control circuit is operable to generate a transmission control signal according to the comparison results or to its derived information. The transmission circuit, coupled to the reception circuit and the control circuit, determines whether packet transmission is allowable according to the comparison results if the transmission control signal indicates a normal state, and the transmission circuit determines whether packet transmission is allowable according to the transmission control signal if the transmission control signal indicates an abnormal state.

16 Claims, 5 Drawing Sheets

(56) References Cited

U.S. PATENT DOCUMENTS

2007/0074090 A1* 3/2007 Trainin ............. H04W 74/0875
714/746
2015/0365971 A1* 12/2015 Chen .................... H04W 24/08
370/252

OTHER PUBLICATIONS

English abstract translation of the Office Action dated Jun. 25, 2015 of the counterpart Taiwan application No. 103120632.
Search report dated Jun. 25, 2015 of the counterpart Taiwan application No. 103120632.
Taiwan Pub. No. TW200718132A is also published as US2007060155A1.
TIPO confirms that there is a typo in the Search Report, TW 200717132 should be listed as TW 200718132.

* cited by examiner

WIRELESS COMMUNICATION DEVICE AND METHOD

BACKGROUND OF THE INVENTION

1. Field of the Invention

The present disclosure relates to a wireless communication device and method, especially to a wireless communication device and method capable of adaptively permitting packet transmission or adjusting a threshold for packet transmission.

2. Description of Related Art

Generally speaking, a wireless device (e.g., a wireless device in compliance with an 802.11 standard) transmits packets through a prescribed channel or one among several prescribed channels. When the wireless device transmits packets, if another wireless device sends packets through the same channel concurrently, the packets from the two wireless devices might interfere with each other, which may cause the packet transmission corresponding to one or both of the two wireless devices to fail. This kind of interference problem is called the packet collision.

In order to avoid packet collision, a plurality of wireless devices in the same network system may adopt the same protocol such as a CSMA/CA (Carrier Sense Multiple Access with Collision Avoidance) protocol specifying collision detection or collision avoidance regulations. For instance, in a contention-based network system in compliance with the CSMA/CA protocol, once a wireless device wins the transmission opportunity under the contention and starts to transmit packets, the other wireless devices running after the same opportunity should suspend their transmission procedure (e.g., the backoff counting procedure or the procedure of sending packets from a media access control layer circuit to a physical layer circuit) during the transmission duration indicated by the winning wireless device, so as to prevent packet collision.

However, if the wireless devices suspend their transmission procedure due to their transmitting signals whose strengths are too low to make any substantial interference, such suspension does nothing good but causes a waste of network throughput. Therefore, a rule for determining whether the suspension is necessary is necessary. More specifically, in a wireless network system abiding by the same protocol (e.g., the CSMA protocol), a wireless device (hereafter, the concerned device) which shares the same frequency channel with other wireless devices listens to signals from the other devices in the channel. Upon receiving a signal, the concerned device measures the strength of the received signal and compares the strength with a predetermined threshold (e.g., Clear Channel Assessment Threshold (CCA threshold) defined by the protocol). If the comparison result shows that the strength of the received signal falls below the predetermined threshold, the received signal could be treated as noise or something negligible; meanwhile, the concerned device may act as though the channel is clear, and either transmit packets or carry out some appropriate steps that are only permitted when the channel is clear. On the contrary, if the comparison result shows that the strength of the received signal is above the predetermined threshold, this signal should be taken valid; in the meantime, the concerned device is required to treat the channel as it is occupied by a valid signal, and should suspend its transmission procedure for the duration indicated by the received signal.

Through the above-described manner, wireless devices can avoid packet collision. However, in some circumstances, the suspension of transmission could be inappropriate. For instance, if a wireless device is positioned in a noisy environment, the wireless device may suspend its transmission procedure continuously or frequently due to the interference of significant noise. In other words, this wireless device may usually find the transmission channel unclear due to the strength of noise often higher than its predetermined threshold, and thus suspends the transmission procedure for a long while or many a time, which seriously degrades the transmission performance. In another case, a wireless device may find the strength of interference signals (which could be signals irrelevant to normal wireless devices) often higher than its predetermined threshold due to its innate structural characteristic or design or the influence from peripheral devices, and thereby suspends the transmission procedure for a long while or many a time, which stops itself from achieving the expected transmission performance.

In consideration of the above, this industry looks forward to a wireless communication technique capable of dealing with a noisy environment and/or the influence from internal or peripheral signals. Such technique may ensure the performance of wireless transmission or prevent the transmission performance from degrading seriously.

SUMMARY OF THE INVENTION

An object of the present disclosure is to provide a wireless communication device and method capable of making improvements over the prior art.

The present disclosure discloses a wireless communication device capable of adaptively permitting packet transmission. An embodiment of the wireless communication device includes: a reception circuit operable to measure signal energy and generate a plurality of energy measurement values, and then generate a plurality of comparison results according to the energy measurement values and at least one threshold; a control circuit, coupled to the reception circuit, operable to generate a transmission control signal according to the plurality of comparison results or its derived information; and a transmission circuit, coupled to the reception circuit and the control circuit, operable to determine whether packet transmission is allowable according to the comparison results if the transmission control signal indicates a normal state, and operable to determine whether packet transmission is allowable according to the transmission control signal if the transmission control signal indicates an abnormal state.

The present disclosure also discloses a wireless communication device capable of adaptively adjusting a threshold for packet transmission. An embodiment of the wireless communication device includes: a control circuit operable to execute gain control to reduce the interference caused by an external signal; and a reception circuit operable to measure residual signal energy after the control circuit reducing the interference and generate an energy measurement value accordingly, and then generate a comparison result according to the energy measurement value and the threshold for packet transmission, wherein if the comparison result indicates a prohibition of packet transmission, the control circuit loosens the threshold for packet transmission.

The present disclosure further discloses a wireless communication device capable of adaptively adjusting a threshold for packet transmission. An embodiment of the wireless communication device includes: a reception circuit operable to measure signal energy and generate a plurality of energy measurement values, and then generate a plurality of comparison results according to the plurality of energy measurement values and the threshold for packet transmission; and a control circuit operable to loosen the threshold for packet transmission after N results, each of which indicates a prohibition of packet transmission, among the plurality of comparison results take place, in which the N is an integer more than 1.

In addition, the present disclosure discloses a wireless communication method which is carried out by the wireless communication device of the present disclosure or the equivalent thereof and capable of adaptively permitting packet transmission. An embodiment of this method includes the following steps: measuring signal energy and thereby generating a plurality of energy measurement values, and then generating a plurality of comparison results according to the plurality of energy measurement values and at least one threshold; generating a transmission control signal according to the plurality of comparison results or its derived information; and determining whether packet transmission is allowable according to the comparison results if the transmission control signal indicates a normal state, and determining whether packet transmission is allowable according to the transmission control signal if the transmission control signal indicates an abnormal state.

The present disclosure also discloses a wireless communication method which is also carried out by the wireless communication device of the present disclosure or the equivalent thereof and capable of adaptively adjusting a threshold for packet transmission. An embodiment of this method includes the following steps: executing gain control to reduce the interference caused by an external signal; after the reduction in the interference, measuring signal energy and generating an energy measurement value; generating a comparison result according to the energy measurement value and the threshold for packet transmission; and if the comparison result indicates a prohibition of packet transmission, loosening the threshold for packet transmission.

The present disclosure further discloses a wireless communication method which is similarly carried out by the wireless communication device of the present disclosure or its equivalent and capable of adaptively adjusting a threshold for packet transmission. An embodiment of this method includes the following steps: measuring signal energy and generating a plurality of energy measurement values accordingly; generating a plurality of comparison results according to the plurality of energy measurement values and the threshold for packet transmission; and after at least a half of the comparison results indicates a prohibition of packet transmission, loosening the threshold for packet transmission.

These and other objectives of the present disclosure no doubt becomes obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms of this technical field. If any term is defined in this specification, such term should be explained accordingly.

The present disclosure includes a wireless communication device and method. The device and method are capable of adaptively permitting packet transmission or adjusting a threshold for packet transmission, and thereby ensuring transmission efficiency or preventing transmission efficiency from degrading unduly. The above-mentioned threshold could be a Clear Channel Assessment (CCA) threshold. However, other types of thresholds could be used instead to carry out the present disclosure while giving consideration to enablement. The present disclosure is applicable to a circuit and method in want of packet collision avoidance (e.g., the circuit and method such as those abiding by the IEEE 802.11 standard series in compliance with the CSMA/CA protocol), and people of ordinary skill in the art can use an alternative means similar or equivalent to that described in this specification to carry out the present disclosure. On account of that some element of the device of the present disclosure could be known, the details of such element are omitted provided that this omission nowhere dissatisfies the specification and enablement requirements. In addition, the method of the present disclosure can be in the form of firmware and/or software which could be executed by the device of this disclosure or its equivalent.

Figure 1:
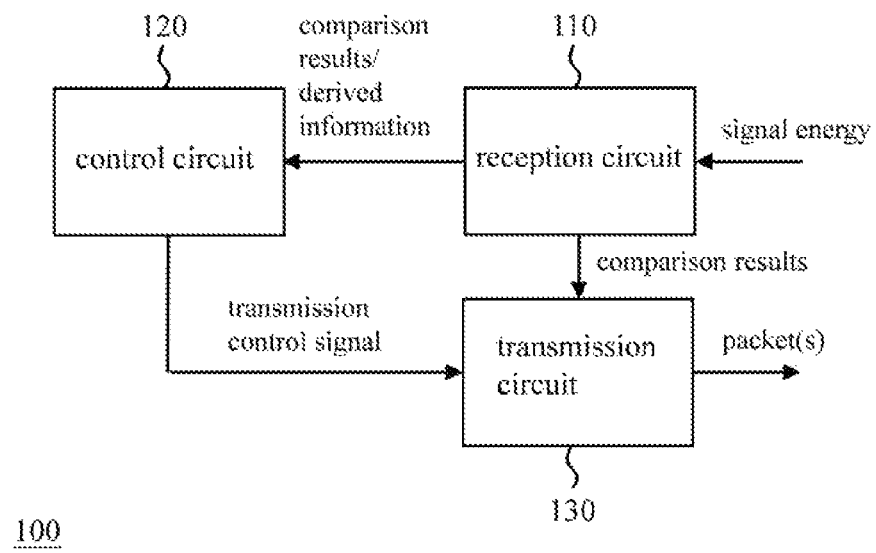
FIG. 1 illustrates an embodiment of the wireless communication device of the present disclosure.
Figure 2:
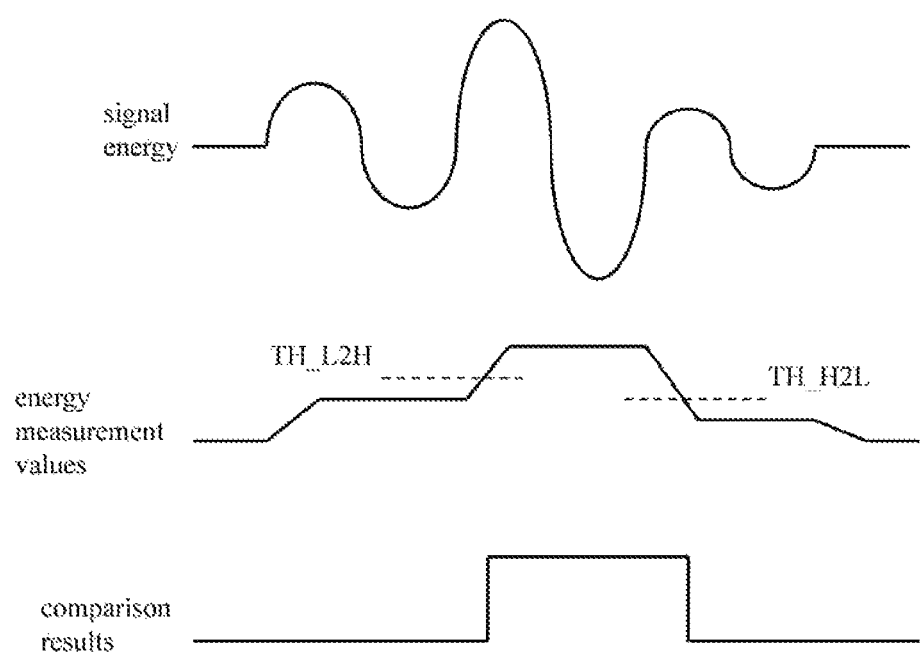
FIG. 2 illustrates the correlations between signal energy, energy measurement values and comparison results.

Referring to FIG. 1, an embodiment of the wireless communication device of the present disclosure is illustrated. The wireless communication device 100 of this embodiment is capable of adaptively permitting packet transmission. The wireless communication device 100 comprises a reception circuit 110, a control circuit 120 and a transmission circuit 130, in which any two or all of the circuits 110, 120, 130 could be integrated or independent from each other. The said reception circuit 110 is operable to measure signal energy, generate a plurality of energy measurement values (e.g., CCA levels), and then generate a plurality of comparison results according to the plurality of energy measurement values and at least one threshold (e.g., CCA threshold). Afterwards, if one of the energy measurement values is lower than the threshold, the corresponding comparison result permits packet transmission. Otherwise, the comparison result prohibits packet transmission. The aforementioned signal energy could be derived from a valid signal of some wireless devices, meaningless background noise or any signal that is available to the reception circuit 110, and the reception circuit 110 may receive signals through an antenna which could be helpful but not a must for the wireless communication device 100 of the present disclosure. In addition, as it is shown in FIG. 2, the at least one threshold includes a level-low-to-high threshold (hereafter, TH_L2H) and a level-high-to-low threshold (hereafter, TH_H2L). Although TH_H2L in FIG. 2 is lower than TH_L2H in FIG. 2 to prevent frequent variation of the comparison results, this is just exemplary. These two thresholds may be the same or different in an alternative embodiment.

Referring to FIG. 1 again, the control circuit 120 is coupled with the reception circuit 110 and operable to generate a transmission control signal according to the plurality of comparison results or to its derived information. The derived information could be the statistics or computation of the comparison results. For instance, the derived information includes an accumulated number of the comparison result(s) allowing packet transmission (in which the accumulated number is called CNT0 in the following paragraph and indicates the accumulated count of the energy measurement value(s) lower than the threshold), an accumulated number of the comparison result(s) prohibiting packet transmission (in which the accumulated number is called CNT1 in the following paragraph and indicates the accumulated count of the energy measurement value(s) higher than the threshold) or the difference between the two accumulated numbers. The transmission circuit 130 is coupled with the reception circuit 110 and the control circuit 120. The transmission circuit 130 is operable to determine whether packet transmission is allowable according to the plurality of comparison results if the transmission control signal indicates a normal state (i.e., the state of normal transmission), and also operable to determine whether packet transmission is allowable according to the transmission control signal if the transmission control signal indicates an abnormal state (i.e., the state of abnormal transmission). For instance, if the plurality of comparison results or the information derived therefrom conforms to a predetermined condition (e.g., the condition requiring that CNT0 is more than CNT1 or the difference between them is more than 0, which means that the majority of the energy measurement values are lower than the at least one threshold; or the condition requiring that (CNT1/CNT0) is smaller than or equal to a predetermined value such as (CNT1/CNT0)≤(55/200)=27.5%, which means that the ratio of transmission prohibition to transmission permission is smaller than or equal to 27.5%), the transmission control signal indicates the normal state and the transmission circuit 130 determines whether packet transmission is permitted according to the comparison results. But if the predetermined condition is not satisfied, the transmission control signal indicates the abnormal state and then the transmission circuit 130 determines whether packet transmission is permitted according to the transmission control signal instead. In this embodiment, during the duration of the transmission control signal indicating the abnormal state, the transmission circuit 130 disregards the comparison results and executes packet transmission directly until the transmission control signal indicates the normal state. In an alternative embodiment, during the duration of the transmission control signal indicating the abnormal state, the transmission circuit 130 executes packet transmission directly for a predetermined time or for a predetermined number of times. Then, the transmission circuit 130 determines whether packet transmission is allowable according to the updated comparison results (or the derived information thereof) and the transmission control signal after the predetermined time or number of times is reached. Similar or equivalent modifications could be derived by those of ordinary skill in the art in light of their demands.

Figure 3:
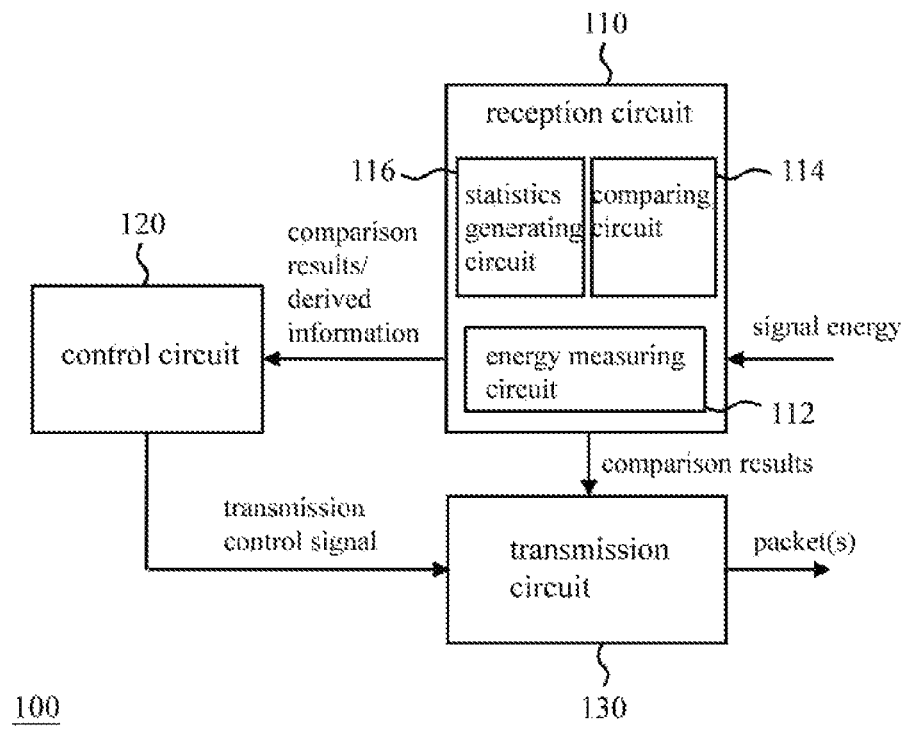
FIG. 3 illustrates an embodiment of the reception circuit of FIG. 1.

Referring to FIG. 3, an embodiment of the reception circuit 110 of FIG. 1 is illustrated. As it is shown in the figure, the reception circuit 110 includes an energy measuring circuit 112, a comparing circuit 114 and a statistics generating circuit 116. The energy measuring circuit 112 is operable to generate the aforementioned energy measurement values. The comparing circuit 114, which could be an energy detection CCA (EDCCA) circuit or its equivalent, is operable to generate the said comparison results according to the energy measurement values and the at least one threshold. The statistics generating circuit 116, which could be a noise histogram measurement (NHM) circuit or its equivalent, is operable to generate the same comparison results according to the energy measurement values and the at least one threshold or to receive the comparison results from the comparing circuit 114 directly and then generate statistics information (e.g., the aforementioned counts CNT0 and CNT1 or the difference between them). Therefore, the control circuit 120 is allowed to generate the transmission control signal according to the statistics information as it is described in the preceding paragraph. It should be noted that any two or all of the energy measuring circuit 112, the comparing circuit 114 and the statistics generating circuit 116 could be integrated or separated in practice.

Figure 4:
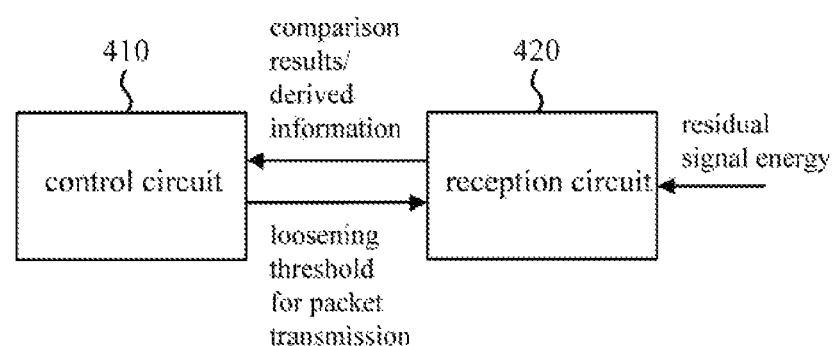
FIG. 4 illustrates another embodiment of the wireless communication device of the present disclosure.

Referring to FIG. 4, another embodiment of the wireless communication device of the present disclosure is illustrated. This embodiment is capable of adaptively adjusting a threshold (e.g., the aforementioned threshold TH_H2L, some other CCA threshold or the like) for packet transmission, and capable of determining whether the prohibition of packet transmission continues after the interference of external signals is reduced, so as to determine whether the threshold for packet transmission should be loosened. As it is shown in FIG. 4, the wireless communication device 400 comprises a control circuit 410 and a reception circuit 420. The said control circuit 410 is operable to execute gain control to reduce (or eliminate) the interference of an external signal. More specifically, after a radio frequency circuit receives the external signal, the radio frequency circuit properly modifies the external signal (e.g., the external signal of xdBm, such as −76 dBm, converted into the external signal of ydBm, such as 2 dBm, in which the y is higher than the x, and the extent of modification is determined in view of the real design) with a gain adjusting circuit (e.g., a gain table circuit), such that a baseband circuit (including an analog-to-digital converter) in the back end is allowed to take care of the external signal with its innate ability. In brief, the control circuit 410 is operable to control the gain adjusting circuit to reduce the gain of the external signal (e.g., to reduce the value of y of the mentioned ydBm), and it could be expected that the baseband circuit in the back end in a normal operation determines that the strength of the external signal is lower than the threshold for packet transmission. The said reception circuit 420, which could be the reception circuit 110 in FIG. 1 or its equivalent, may comprise the above-mentioned radio frequency circuit and the baseband circuit. The reception circuit 420 is operable to measure residual signal energy and thereby generate an energy measurement value after the control circuit 410 restrains the interference of the external signal, and operable to generate a comparison result according to the energy measurement value and the threshold for packet transmission. In a general case, since the gain of the external signal has been restrained by the control circuit 410, the comparison result is supposed to indicate that the energy measurement value is lower than the threshold for packet transmission (which means that packet transmission is allowable). But if the comparison result shows that the energy measurement value is higher than the threshold for packet transmission (which means that packet transmission is prohibited), the result implies that the threshold for packet transmission could be too low to find out whether the external signal causes substantial interference (while the reason of incapability could be the resolution of the back end circuit failing to reach the expectation due to its design or manufacturing process). Therefore, the control circuit 410 loosens (e.g., raises) the threshold for packet transmission in accordance with the comparison results or the information derived therefrom until the comparison results indicate that the packet transmission is allowable while the interference of external signals is suppressed. It should be noted that the timing for carry out the embodiment of FIG. 4 is preferred to be the moment of starting or resetting the wireless communication device 400, and the embodiment may suspend after the adjustment in the threshold is completed. However, people of ordinary skill in the art may choose the timing and number of times for executing the present disclosure.

Figure 5A:
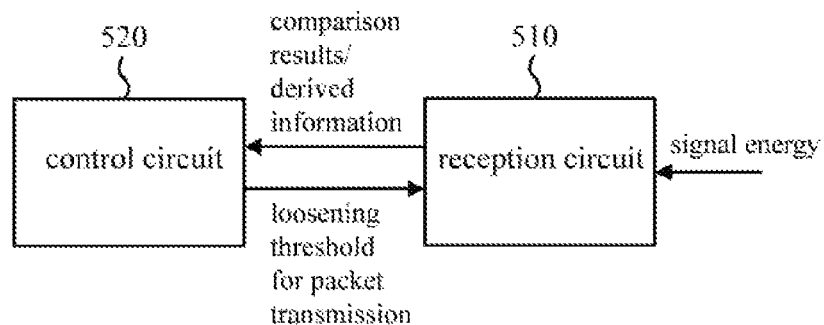
FIG. 5*a* illustrates yet another embodiment of the wireless communication device of the present disclosure.
Figure 5B:
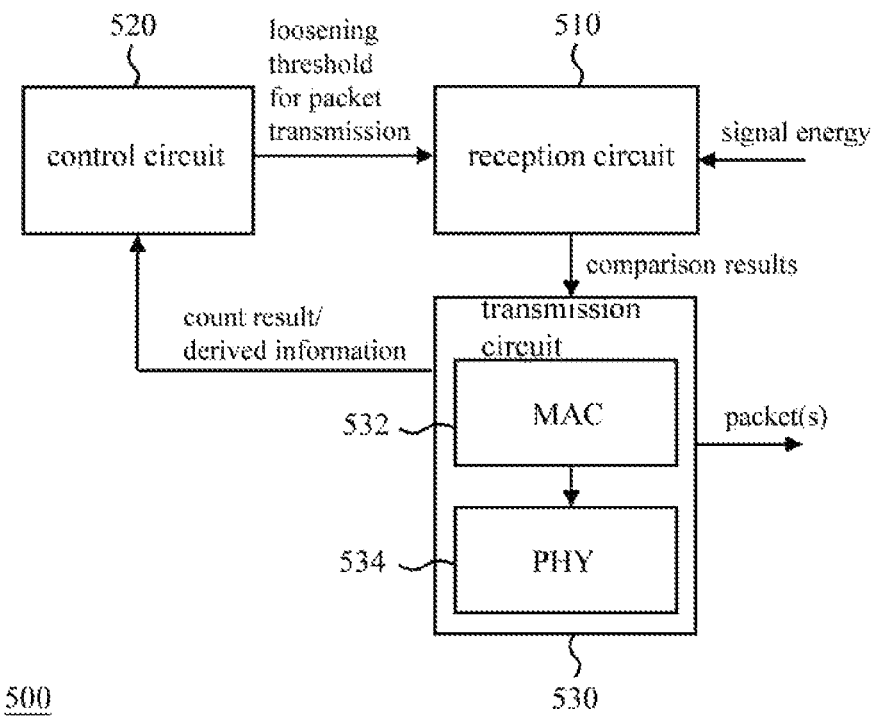
FIG. 5*b* illustrates a further embodiment of the wireless communication device of the present disclosure.

Referring to FIG. 5*a*, yet another embodiment of the wireless communication device of the present disclosure is illustrated. This embodiment is also capable of adaptively adjusting a threshold for packet transmission (e.g., the threshold TH_H2L or some CCA thresholds). As it is shown in FIG. 5*a*, the wireless communication device 500 comprises a reception circuit 510 and a control circuit 520. The reception circuit 510, which could be the same as the reception circuit 110 of FIG. 1 or the equivalent thereof, is operable to measure signal energy and thereby generate a plurality of energy measurement values, and operable to generate a plurality of comparison results according to the plurality of energy measurement values and the said threshold for packet transmission. The control circuit 520 is operable to loosen the threshold for packet transmission after N comparison results, each of which indicates a prohibition of packet transmission, among the plurality of comparison results take place, in which the N is an integer more than 1. For example, the control circuit 520 may determine whether at least a half of the comparison results indicate a prohibition of packet transmission according to the comparison results or to its derived information (e.g., the aforementioned statistics CNT0 and CNT1) directly. If at least a half of the comparison results indicate a prohibition of packet transmission, the control circuit 520 loosens the threshold for packet transmission until more than a half of the comparison results indicates an allowance of packet transmission. Another example is shown in FIG. 5*b*. The wireless communication device 500 further comprises a transmission circuit 530. The transmission circuit 530 includes a media access control layer (MAC) circuit 532 and a physical layer (PHY) circuit 534, in which the MAC circuit 532 is operable to attempt to send several packets to the PHY circuit 534 according to the plurality of comparison results, operable to count the packet(s) of the several packets successfully delivered to the PHY circuit 534 and then to generate a count result. More specifically, if the comparison results indicate that an energy measurement value is lower than the threshold for packet transmission (which means that packet transmission is allowable), the MAC circuit 532 is allowed to send one or more packets to the PHY circuit 534 within a predetermined period and make the count result reflect this successful packet transmission. Accordingly, the control circuit 520 is able to find out whether N results, each of which indicates a prohibition of packet transmission, among the plurality of comparison results take place according to the count result or the information derived therefrom (e.g., according to whether the counter result is less than a half of the total packet number) and then determine whether the threshold for packet transmission should be altered. It should be noted that the total packet number could be set in advance, and the packets could be beacon packets (if the wireless communication device 500 plays the role of a wireless access point), probe request packets (if the wireless communication device 500 plays the role of a wireless network interface card), null packets or data packets. It should be also noted that the timing for carrying out the embodiment of FIGS. 5*a*, 5*b* could be the moment of starting or resetting the wireless communication device 500, and the embodiment can suspend after finishing adjusting the said threshold. Of course those of ordinary skill in the art may choose the timing and number of times for executing the present disclosure. It should be further noted that one may carry out only one of the embodiments of FIG. 5*a*, FIG. 5*b* and FIG. 4. However, since the implementations of these embodiments do not conflict with each other, multiple embodiments could be executed jointly.

Figure 6:
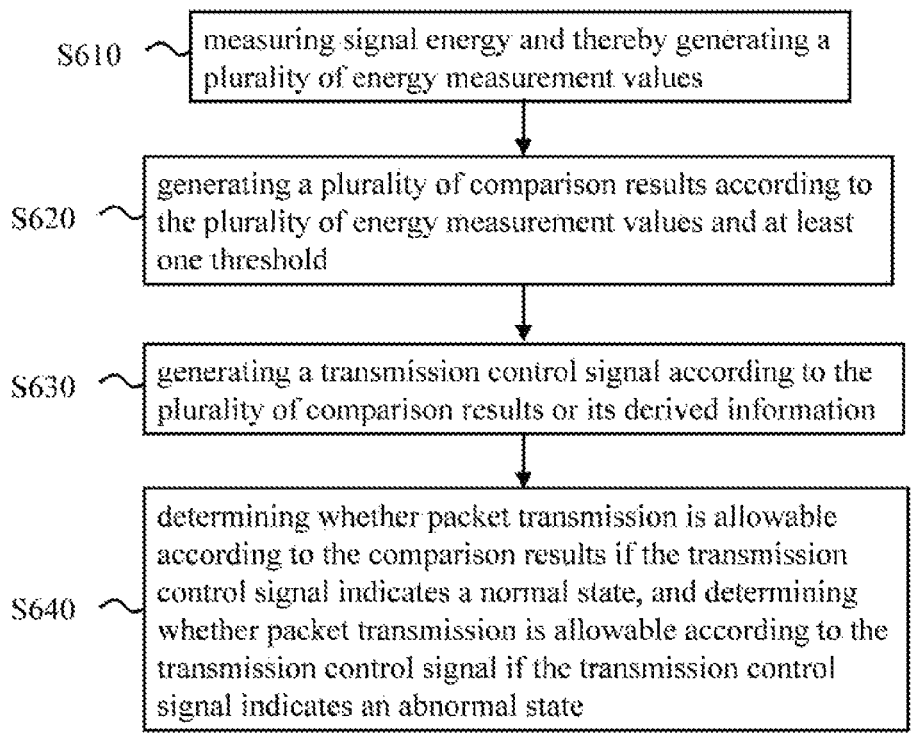
FIG. 6 illustrates an embodiment of the wireless communication method of the present disclosure.

In addition to the device of FIG. 1, the present disclosure discloses a wireless communication method which could be carried out by the wireless communication device 100 of FIG. 1 or its equivalent. As it is shown in FIG. 6, an embodiment of the method comprises the following steps:

Step S610: measuring signal energy and thereby generating a plurality of energy measurement values. This step could be executed through the reception circuit 110 of FIG. 1 or its equivalent.

Step S620: generating a plurality of comparison results according to the plurality of energy measurement values and at least one threshold. This step could be executed through the reception circuit 110 of FIG. 1 or its equivalent.

Step S630: generating a transmission control signal according to the plurality of comparison results or its derived information. This step could be executed through the control circuit 120 of FIG. 1 or its equivalent.

Step S640: determining whether packet transmission is allowable according to the comparison results if the transmission control signal indicates a normal state, and determining whether packet transmission is allowable according to the transmission control signal if the transmission control signal indicates an abnormal state. This step could be executed through the transmission circuit 130 of FIG. 1 or its equivalent.

Since those of ordinary skill in the art can appreciate the implementation details and modifications of this embodiment by referring to the fore-illustrated embodiment of FIG. 1 whose features can be reasonably adopted here, repeated and redundant description is therefore omitted while the remaining disclosure is still enough for understanding and enablement.

Figure 7:
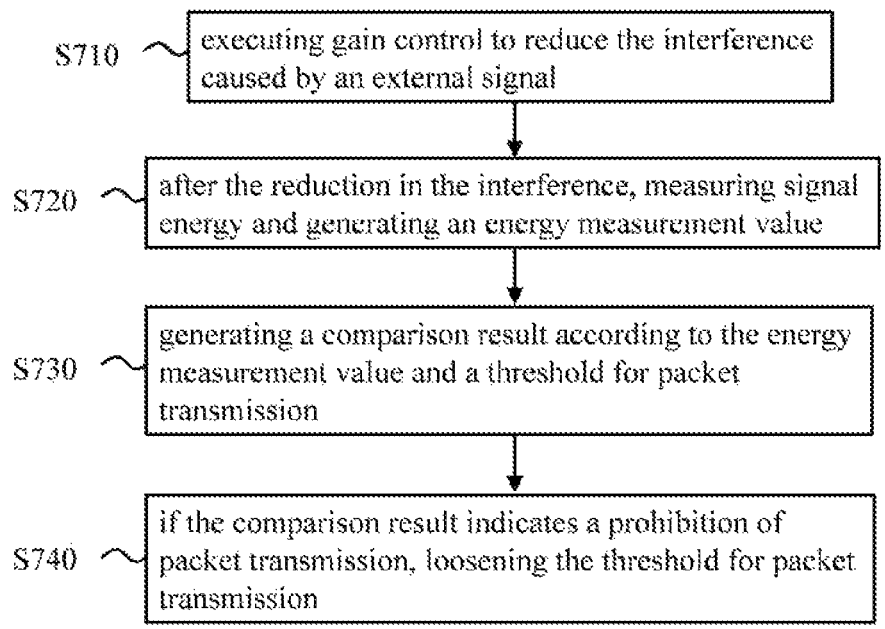
FIG. 7 illustrates another embodiment of the wireless communication method of the present disclosure.

In addition to the device of FIG. 4, the present disclosure discloses a wireless communication method which could be carried out by the wireless communication device of FIG. 4 or the equivalent thereof. As it is shown in FIG. 7, an embodiment of this method comprises the following steps:

Step S710: executing gain control to reduce the interference caused by an external signal. This step could be executed by the control circuit 410 of FIG. 4 or its equivalent.

Step S720: after the reduction in the interference, measuring signal energy and generating an energy measurement value. This step could be executed by the reception circuit 420 of FIG. 4 or its equivalent.

Step S730: generating a comparison result according to the energy measurement value and a threshold for packet transmission. This step could be executed by the reception circuit 420 or its equivalent.

Step S740: if the comparison result indicates a prohibition of packet transmission, loosening the threshold for packet transmission. This step could be executed by the control circuit 410 or its equivalent.

Similarly, since those of ordinary skill in the art can appreciate the implementation detail and modifications of this embodiment by referring to the fore-illustrated embodiment of FIG. 4 (whose features can be reasonably adopted here), repeated and redundant description is therefore omitted while giving consideration to disclosure and enablement requirements.

Figure 8:
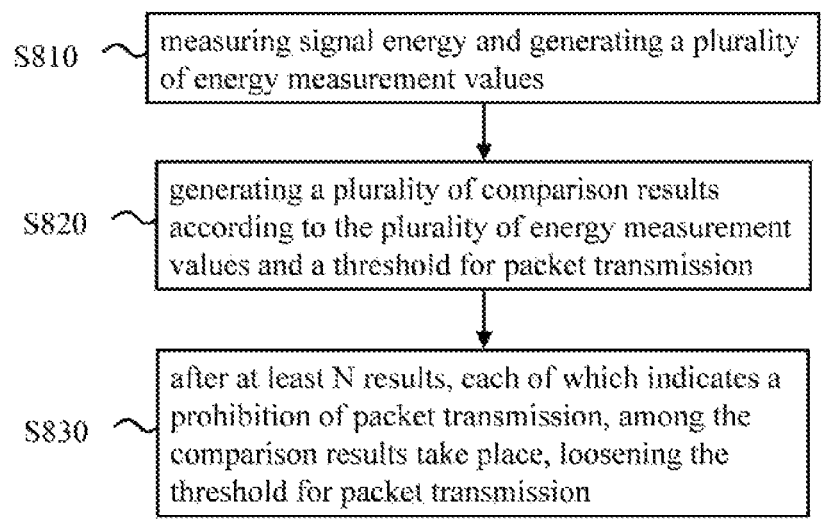
FIG. 8 illustrates yet another embodiment of the wireless communication method of the present disclosure.

In addition to the devices of FIG. 5*a* and FIG. 5*b*, the present disclosure discloses a wireless communication method that could be carried out by the wireless communication device of FIG. 5*a* or FIG. 5*b* or the equivalent thereof. As it is shown in FIG. 8, an embodiment of this method comprises the following steps:

Step S810: measuring signal energy and generating a plurality of energy measurement values accordingly. This step could be executed through the reception circuits 510 of FIGS. 5*a*, 5*b* or the equivalent thereof.

Step S820: generating a plurality of comparison results according to the plurality of energy measurement values and a threshold for packet transmission. This step could be executed through the reception circuits 510 of FIGS. 5*a*, 5*b* or the equivalent thereof.

Step S830: after at least N results (e.g., at least a half of the comparison results) among the comparison results indicate a prohibition of packet transmission, loosening the threshold for packet transmission. This step could be executed by the control circuit 520 of FIG. 5*a* or the control circuit 520 and transmission circuit 530 of FIG. 5*b*.

Similarly, since those of ordinary skill in the art can appreciate the implementation details and modifications of this embodiment by referring to the fore-illustrated embodiment of FIGS. 5*a*, 5*b* whose features can be reasonably adopted here, repeated and redundant description is therefore omitted provided that the remaining disclosure is still enough for understanding and enablement.

It should be noted that in the above-disclosed embodiments, the allowance/prohibition of packet transmission is realized through allowing/forbidding the MAC circuit in the transmission circuit outputting packet(s) to the PHY circuit. However, this is just exemplary, and those of ordinary skill in the art can execute the allowance/prohibition of packet transmission in her/his favorable stage according to the disclosure of the present disclosure and the design requirement. It should also be noted that each embodiment in the forgoing description includes one or more features, and if an implementation derived from one or more of the embodiments is practicable, a person of ordinary skill in the art can selectively make use of some or all of the features in one embodiment or selectively make use of the combination of some or all features in several embodiments to have the implementation come true.

In summary, the wireless communication device and method of the present disclosure can adaptively allow packet transmission or adjust a threshold for packet transmission so as to adapt themselves to the influence of noisy environment and/or internal/peripheral signals. This ensures that transmission performance or prevents transmission performance from degrading seriously.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A wireless communication device capable of adaptively permitting packet transmission, said wireless communication device comprising:
   a reception circuit operable to measure signal energy and generate a plurality of energy measurement values, and then to generate a plurality of comparison results according to the energy measurement values and at least one threshold;
   a control circuit, coupled to the reception circuit, operable to generate a transmission control signal according to the plurality of comparison results or derived information of the comparison results; and
   a transmission circuit, coupled to the reception circuit and the control circuit, operable to allow packet transmission according to the comparison results if the transmission control signal indicates a normal state, and operable to allow packet transmission if the transmission control signal indicates an abnormal state.

2. The wireless communication device of claim 1, wherein if the plurality of comparison results or the derived information of the comparison results shows that the majority of the energy measurement values are higher than the at least one threshold, the transmission control signal indicates the abnormal state.

3. The wireless communication device of claim 2, wherein the at least one threshold includes a level-low-to-high threshold and a level-high-to-low threshold which are different from each other.

4. The wireless communication device of claim 3, wherein the level-low-to-high threshold is higher than the level-high-to-low threshold.

5. The wireless communication device of claim 1, wherein the reception circuit includes:
   an energy measuring circuit operable to generate the plurality of energy measurement values;
   a comparing circuit operable to generate the plurality of comparison results; and
   a statistics generating circuit operable to generate statistics information according to the plurality of comparison results,
   wherein the control circuit is operable to generate the transmission control signal according to the statistics information.

6. The wireless communication device of claim 1, wherein if the transmission control signal indicates the abnormal state, the transmission circuit disregards the plurality of comparison results.

7. The wireless communication device of claim 1, wherein if one of the energy management values is lower than the at least one threshold, a corresponding comparison result of the comparison results permits packet transmission, so that the transmission circuit allows packet transmission according to the corresponding comparison result if the transmission control signal indicates the normal state.

8. A wireless communication device capable of adaptively adjusting a threshold for packet transmission, said wireless communication device comprising:
   a reception circuit operable to measure signal energy and generate a plurality of energy measurement values, and operable to generate a plurality of comparison results according to the plurality of energy measurement values and the threshold for packet transmission; and a control circuit operable to loosen the threshold for packet transmission after N results, each of which indicates a prohibition of packet transmission, among the plurality of comparison results take place, in which the N is an integer more than 1.

9. The wireless communication device of claim 8, further comprising a transmission circuit which includes:
a media access control layer (MAC) circuit operable to try to send several packets to a physical layer circuit according to the plurality of comparison results, and then count the packet(s) of the several packets successfully sent to the physical layer circuit to generate a count result,
wherein the control circuit realizes that the N results indicate the prohibition of packet transmission in accordance with the count result or the information derived therefrom.

10. The wireless communication device of claim 9, wherein the MAC layer circuit counts the packet(s) of the several packets successfully sent to the physical layer circuit within a predetermined period in which the amount of the several packets is predetermined.

11. A wireless communication method which is carried out by a wireless communication device and capable of adaptively permitting packet transmission, said wireless communication method comprising the following steps:
measuring signal energy to thereby generate a plurality of energy measurement values, and then generating a plurality of comparison results according to the plurality of energy measurement values and at least one threshold;
generating a transmission control signal according to the plurality of comparison results or derived information of the comparison results; and
allowing packet transmission according to the comparison results if the transmission control signal indicates a normal state, and allowing packet transmission if the transmission control signal indicates an abnormal state.

12. The wireless communication method of claim 11, wherein if the plurality of comparison results or the derived information of the comparison results shows that the majority of the energy measurement values are higher than the at least one threshold, the transmission control signal indicates the abnormal state.

13. The wireless communication method of claim 12, wherein the at least one threshold includes a level-low-to-high threshold and a level-high-to-low threshold which are different from each other.

14. The wireless communication method of claim 11, further comprising:
generating statistics information according to the plurality of comparison results,
wherein the step of generating the transmission control signal includes: generating the transmission control signal according to the statistics information.

15. The wireless communication method of claim 11, wherein if the transmission control signal indicates the abnormal state, the plurality of comparison results is disregarded.

16. The wireless communication method of claim 11, wherein if one of the energy management values is lower than the at least one threshold, a corresponding comparison result of the comparison results permits packet transmission, so that packet transmission is allowed according to the corresponding comparison result if the transmission control signal indicates the normal state.

* * * * *